United States Patent [19]

Kasprzyk

[11] Patent Number: 4,789,506

[45] Date of Patent: Dec. 6, 1988

[54] METHOD OF PRODUCING TUBULAR CERAMIC ARTICLES

[75] Inventor: Martin R. Kasprzyk, Ransomville, N.Y.

[73] Assignee: Gas Research Institute, Chicago, Ill.

[21] Appl. No.: 928,204

[22] Filed: Nov. 7, 1986

[51] Int. Cl.$^4$ .............................................. C04B 35/56
[52] U.S. Cl. ...................................... 264/25; 264/22; 264/60
[58] Field of Search ............................ 264/60, 22, 25

[56] References Cited

U.S. PATENT DOCUMENTS

| | | | |
|---|---|---|---|
| 801,296 | 3/1905 | Bolling | 423/299 |
| 1,266,478 | 3/1917 | Hutchins | 204/62 |
| 1,756,457 | 4/1930 | Fourment | 423/346 |
| 3,495,939 | 2/1970 | Forrest | 423/345 |
| 3,882,210 | 5/1975 | Crossley | 264/63 |
| 3,951,587 | 4/1976 | Alliegro | 264/60 |
| 4,154,787 | 5/1979 | Brown | 264/60 |
| 4,265,843 | 5/1981 | Dias et al. | 264/57 |

*Primary Examiner*—James Derrington
*Attorney, Agent, or Firm*—Donald C. Studley

[57] ABSTRACT

The present invention relates to methods and apparatus for producing tubular articles of silicon carbide and silicon. The articles contain silicon in both metallic and in chemically combined form. The method consists of the steps of concentrically positioning a vertical tubular columns of particulate silicon contiguous to a hollow, vertical tubular columns of particulate silicon carbide, carbon, or mixtures of silicon and carbon, and heating the adjacent columns to a siliciding temperature. The silicon component infiltrates the column containing the particulate silicon carbide, carbon, or mixtures thereof, forming a tubular product. The apparatus consists of supply hoppers for holding the particulate feed material, a loading means comprised of spaced, concentrically arranged, tubular forms. The loading means is positioned within a vertically positioned electrical induction furnace. Particulate feed materials are dry cast in the spaces between and around the forms. The loading means is then removed leaving separate vertical, hollow columns of particulate feed materials concentrically arranged with the furnace. The furnace is then heated from top to bottom to a siliciding temperature. The silicon component infiltrates the column containing silicon carbide, carbon or mixtures thereof to form a dense, tubular silicon-silicon carbide product.

13 Claims, 4 Drawing Sheets

METHOD OF PRODUCING TUBULAR CERAMIC ARTICLES

BACKGROUND OF THE INVENTION

The present invention relates to tubular ceramic articles comprised of silicon and silicon carbide, and to processes and apparatus for the manfacture of such articles.

Silicon carbide, a crystalline compound of silicon and carbon, has long been known for its hardness, strength, and excellent resistance to oxidation and corrosion. Silicon carbide has a low coefficient of expansion, good heat transfer properties and exhibits high strength and excellent creep resistance at elevated temperatures. These desirable properties may be attributed to a strong covalent chemical bonding, which also is the cause of an undesirable property of silicon carbide, that of being difficult to work or fabricate the material into useful shapes. For example, because silicon carbide dissociates at high temperatures, rather than melting, it is not feasible to fabricate articles by melt processes, and because silicon carbide has a very slow diffusion rate, fabrication by plastic deformation processes is not viable.

It has been proposed to produce shaped silicon carbide articles by forming bodies of silicon carbide particles and either bonding or sintering the particles at high temperatures to form a consolidated body. If the particulate silicon carbide starting material is fine enough, and suitable sintering aids are added, the fine, particulate material will exhibit sufficient self-diffusion at high temperatures that the particulate material will sinter and form into a substantially dense single phase material. Sintering processes, in general, require fine powder starting materials and pressureless sintering processes, in particular, require an even finer starting material. Because of the needed fineness and high purity of the starting materials, articles formed by sintering processes are relatively expensive.

Coarser and less pure silicon carbide powders are known to bond together at high temperatures. However, the resultant products have considerable porosity and for that reason are usually not as strong, or as corrosion resistant, as more fully densified materials. The properties of such materials may be substantially improved by infiltrating the pores of such materials with silicon, in either vapor or liquid form, to produce a two phase, silicon-silicon carbide product. Although such processes utilize relatively inexpensive coarse powders as starting materials, they require two high temperature furnacings, one to form the silicon carbide to silicon carbide bond and a second, separate furnacing, to infiltrate the formed body with silicon.

Mixtures of coarser and less pure silicon carbide powders with particulate carbon or with a carbon source material may be preformed and subsequently impregnated with silicon at high temperature to form "reaction bonded" or "reaction sintered" silicon carbide products. The carbon component may be in the form of particulate graphite or amorphous carbon, or may be in the form of a carbon source material, for example a carbonizable organic material, such as, pitch, resin or similar materials, which will decompose during furnacing to yield carbon. The infiltrating silicon reacts with the carbon in the preformed body to form additional silicon carbide which bonds with the original silicon carbide particles to produce a dense silicon carbide article. Typically reaction bonded silicon carbide materials are characterized by almost zero porosity and the presence of a second phase, or residual, of silicon, usually greater than about 8% by volume.

In typical siliciding or typical reaction bonding processes, the particulate silicon carbide and carbon starting material is initially preformed or preshaped into an article, commonly referred to as a "green body", which is subsequently fired. The particulate silicon carbide and carbon starting mixture is commonly blended with a binder to aid in shaping. If the binder is dry, or relatively dry, the powder may be compacted to the desired shaped green body using a press or isopress. If the binder is liquid, or semi-liquid, and is used in sufficient quantity, the mixture may suitably be slip cast, extruded or injection molded to form a shaped green body.

High temperature heat exchange components desirably have relatively thin walls to facilitate high rates of heat transfer. There have been previous attempts to fabricate tubular articles of silicon carbide by various methods, however, none have proven commercially successful. For example, U.S. Pat. No. 801,296 discloses a method of producing a hollow silicon carbide tube by siliciding a solid carbon rod to form an outer layer of silicon carbide and subsequently burning out the carbon interior leaving the outer layer of silicon carbide. U.S. Pat. No. 1,266,478 describes a typical method of preforming a tubular body of silicon carbide and carbon and siliciding to obtain a tubular silicon carbide article. U.S. Pat. No. 1,756,457 teaches the reaction of silicon dioxide and carbon in preformed columns to produce a silicon carbide tube. U.S. Pat. No. 3,495,939 teaches making tubular silicon carbide by preforming a tube of particulate silicon carbide and carbon, positioning the tube vertically in a furnace and siliciding with the bottom of the tube in contact with liquid silicon. U.S. Pat. No. 3,882,210 teaches siliciding a preformed tube of alpha silicon carbide and graphite to produce a tube of silicon carbide. U.S. Pat. No. 4,265,843 describes the manufacture of silicon carbide in tubular form by initially heating at low temperature a rotating preformed carbon tube in the presence of silicon to impregnate the tube and subsequently heating at a higher temperature to react the silicon and carbon to form a tube of silicon carbide.

It will be appreciated that the fabrication of long, (e.g., four to eight foot), large diameter, (e.g., four to eight inch OD), thin-walled, (e.g., ⅛ to ¼ inch), tubes presents a difficult problem. The tubular green bodies that are required to be initially formed by the prior art processes are inherently structurally weak and easily deformed or broken unless handled with utmost care. In subsequent processing steps, the tubular green bodies must be carefully dried, and/or baked, and positioned in a furnace for siliciding. The fragility of the preformed bodies and the required multiple handling entailing high labor imput have been major factors in preventing the use of tubular silicon carbide in many applications purely on the basis of cost.

The term "reaction sinter" as used herein means consolidation by chemical reaction and includes the reaction of silicon with carbon either alone or in mixture with silicon carbide.

The term "carbon" as used herein means carbon or a carbon source material that produces carbon upon heating that will react with the infiltrating silicon to form additional silicon carbide, in situ.

The term "tubular" as used herein means that the article has the form of a tube, that is, it is fistulous. Although the present invention will hereinafter be described in terms of tubes having generally round cross-sections, it will be understood that the invention is not so limited and that tubes having eliptical, square or multi-sided cross-sections, or having an external surface of one cross-sectional type and an internal surface of another, may as easily be produced. It will also be understood that the present invention also contemplates tubular articles that have internal separations, or septums, providing multiple passageways within the tube.

GENERAL DESCRIPTION OF THE INVENTION

The present invention relates to tubular articles of manufacture comprised of silicon carbide and silicon and to methods and apparatus for the production of such articles. The articles are characterized in that they contain silicon in metallic and in chemically combined form.

The method consists of the steps of concentrically positioning at least one hollow, vertical tubular column of particulate silicon adjacent to, or contiguous to, at least one hollow, vertical tubular column of particulate silicon carbide, carbon, or mixtures of silicon and carbon, and heating the adjacent columns to a siliciding temperature, that is, a temperature above the melting point of silicon (about 1410 to 1420 degrees C.) and less than about 2400 degrees C. At such temperatures the particulate silicon component melts or vaporizes and infiltrates into the pores of the column containing the particulate silicon carbide, carbon, or mixtures thereof, forming a tubular ceramic product.

The apparatus consists of a plurality of supply hoppers for holding a particulate feed material, a loading means comprised of at least two spaced, concentrically arranged, dimensionally stable, tubular form members. The loading means is of a size to spacedly fit within the furnace tube of a vertically positioned electrical induction furnace and is moveable in and out of the furnace tube. Selected particulate feed materials are dry cast, suitably by flowing, into the spaces between and around the form members. For example, the loading means is initially centrally, or coaxially, positioned in the furnace tube, spacedly surrounding the furnace heating element. After the filling, or dry casting, operation is completed, the loading means is removed from the furnace. The space between the outer form member and the inner furnace wall is suitably filled with a particulate heat-insulating material, the space between the form members is selectively filled with silicon, carbon, or mixtures thereof and the space between the inner form and the heating element is selectively filled with silicon. After the dry casting operation, separate vertical, hollow columns of particulate feed materials remain concentrically arranged within the furnace. The furnace is subsequently progressively, or incrementially, heated from top to bottom to a siliciding temperature. The silicon component infiltrates the column containing silicon carbide, carbon or mixtures thereof. The infiltrated column is subsequently cooled to form a dense, tubular silicon carbide product.

The particulate silicon carbide starting material is of a sufficiently coarse particle size that the material is easily flowable through the apparatus without plugging. Suitably the particles are greater than 50 microns and less than 500 microns in diameter, and the term "particulate" as used herein carries this meaning. The particulate silicon carbide starting material may be of a single particle size or may consist of a combination of separate particle sizes to enable higher packing efficiencies.

Particulate carbon may be utilized as a sole feed material, or may be used in mixture with particulate silicon carbide. The particulate carbon component reacts with the infiltrating silicon to form silicon carbide, in situ, reducing the amount of free unreacted silicon remaining in the finished product. The amount of free silicon desired in the finished product is dependent upon the use of the product. For example, if the end product requires abrasion, oxidation, or corrosion resistance, a minimal, or minor, amount of free silicon and free carbon would be desired in the product, as the hardness and chemical inertness of silicon and carbon is less than that of silicon carbide.

In a particularly useful alternate embodiment of the invention, particulate graphite and particulate silicon are utilized as the starting materials. In such embodiment separate, adjacent columns of particulate graphite and particulate silicon are heated to a siliciding temperature. The silicon infiltrates the graphite column reacting with the graphite to form silicon carbide. If the particulate graphite is fine, less than about 50 microns, the graphite will be substantially completely converted to silicon carbide. If the graphite particles are larger than about 50 microns in diameter, a thin layer of silicon carbide will form on the graphite particles and a three phase material will be produced. Such material has silicon and graphite as major phases with a minor phase of silicon carbide.

The presence of a large amount of graphite phase affects the physical properties of the present products. Graphite, a crystalline form of carbon, has a low elastic modulus, low thermal expansion rate, and a high thermal conductivity. When incorporated in the present products in amounts over about ten percent by volume, the products show improved thermal shock and thermal stress resistance. Amounts of greater than about sixty percent by volume are difficult to achieve using silicon infiltration processing.

The present process may be characterized in that no green body, a prerequisite of the previous tube forming methods, is required or produced by the present invention. Particulate material is fed into the furnace, and after firing, a finished ceramic tube is removed from the furnace.

DETAILED DESCRIPTION OF THE INVENTION

The present tubular articles are composites which contain silicon in free, unreacted, and in chemically combined forms. The composites are comprised of free, unreacted, silicon and a material selected from silicon carbide, carbon, or mixtures thereof. The final product contains from about five to about sixty percent, and more typically from about ten to 55 percent by volume free silicon; from about forty to about 95 percent, and more usually from about 45 to about ninety percent by volume silicon carbide, and; from about zero to about forty percent by volume free carbon.

The composite tubular articles are produced by dry casting, that is by forming, suitably by flowing, adjacent, or contiguous hollow, coaxially arranged, vertical columns of selected particulate starting materials. The hollow concentric columns of particulate material are subsequently heated to react the materials in the columns to form a tubular product. The columns individually consist of particulate silicon and of particulate silicon carbide, carbon, or mixtures thereof. The attached drawings, discussed in detail below, illustrate apparatus particularly suited to carrying out a dry casting process. The heating step is preferably carried out by induction heating, under an inert atmosphere, or in a vacuum. Suitable siliciding temperatures are above the melting point of silicon, usually at least about 1500 degrees C., but below about 2400 degrees C.

The silicon component can be particulate, commercial grade silicon, having an average particle size ranging from about 1500 to less than about forty microns. A particularly useful silicon material ranges from about 100 to about 1000 microns in diameter. The size of the silicon particles is not critical, except for flow and packing characteristics, as the silicon component is completely melted during the siliciding process.

The silicon carbide component is also particulate, that is the particles have an diameter of less than about 500 microns, and more preferably have an average particle size between about 75 and about 300 microns in diameter. The silicon carbide component may suitably be selected from alpha or beta phase silicon carbide. Mixtures of alpha and beta phase material may be used. The silicon carbide starting material does not require seperation or purification, minor amounts of unreacted carbon, silicon and silicon dioxide, as well as minor amounts of impurities such as iron, calcium, magnesium and aluminum, may be present without deleterious affect.

The carbon component may be either amorphous carbon or graphite provided that it is of a size that it is free-flowing and is free-flowing when used in mixtures with silicon carbide. Free-flowing carbon materials having a particle size ranging between about 0.01 and about fifty microns, and preferably having an average particle size between about 0.5 and about 25 microns are aptly suited to use, if no ureacted carbon is desired in the final product. If unreacted carbon is desired in the final product, a coarser carbon starting material is utilized, and in such case, carbon materials having particle sizes ranging from about 50 to about 1500 microns and more preferably between about 100 to about 1000 microns are typically useful.

In carrying out the present siliciding operation the hollow column of particulate silicon melts and infiltrates into the hollow column containing particulate silicon carbide, carbon, or mixtures thereof. In such event the wall of the latter column may be subject to partial collapse because of the loss of support of the adjacent wall as the silicon component is removed by melting. This situation can be greatly minimized, or prevented entirely, by blending a small amount of a dry particulate temporary binder, for example, a thermosetting resin, suitably a phenolic resin, in the feed material used for the column comprised of silicon carbide, carbon, or mixtures thereof. Alternatively resin may be added to the feed material by dissolving the resin in a solvent, such as, acetone, and blending the resin solution into the feed material. Subsequent drying will deposit the resin in a coherent, substantially even manner on the particles of the feed material. Amounts of resin between about one-half and about ten percent by weight of the feed material are generally useful. The binder should be one that will leave a carbon residue in the column upon heating, in such case the residue will provide additional carbon for reaction with the silicon component.

The siliciding step is carried out at temperatures above the melting point of silicon, about 1410 to 1420 degrees C., and at a temperature less than about 2400 degrees C. The siliciding step is carried out in an inert atmosphere, or in a vacuum, the latter being preferred. Vacuums between about 0.001 Torr and about 2.0 Torr are eminently suited to use. If an inert atmosphere is utilized slightly higher siliciding temperatures will usually be required. Suitable inert atmospheres are for example, nitrogen and nobel gases, such as, argon and helium. An inert atmosphere is one that will not deleteriously affect the siliciding process. After the siliciding process is complete, the tubular product is preferably allowed to cool in the furnace to a temperature below about 1200 degrees C. while the inert atmosphere or vacuum maintained to prevent oxidation of the product. The weight amount of silicon to completely infiltrate the hollow column of particulate silicon carbide, carbon, or mixtures thereof, can be calculated from the packing density of the silicon carbide or carbon grain, the amount and type of carbon, the particle size of the components and the desired thickness and composition of the tubular product. The proper amount may be calculated from such data, or may be determined emphirically.

The preferred form of heating is by electrical induction heating and a preferred furnace is a vertical vacuum induction furnace which may be of a core-type or a coreless type. Heating is carried out from the top of the furnace to the bottom, that is, the siliciding process is progressively carried out starting from the top of particulate, concentrically arranged, hollow columns of the starting materials and proceeding to the bottom, or base, of the columns.

THE DRAWINGS

The invention will now be further illustrated in greater detail by reference to the attached drawings which illustrate apparatus particularly suited to carry out the present invention. Similar components are designated by like reference numbers throughout the several views.

Figure 1:
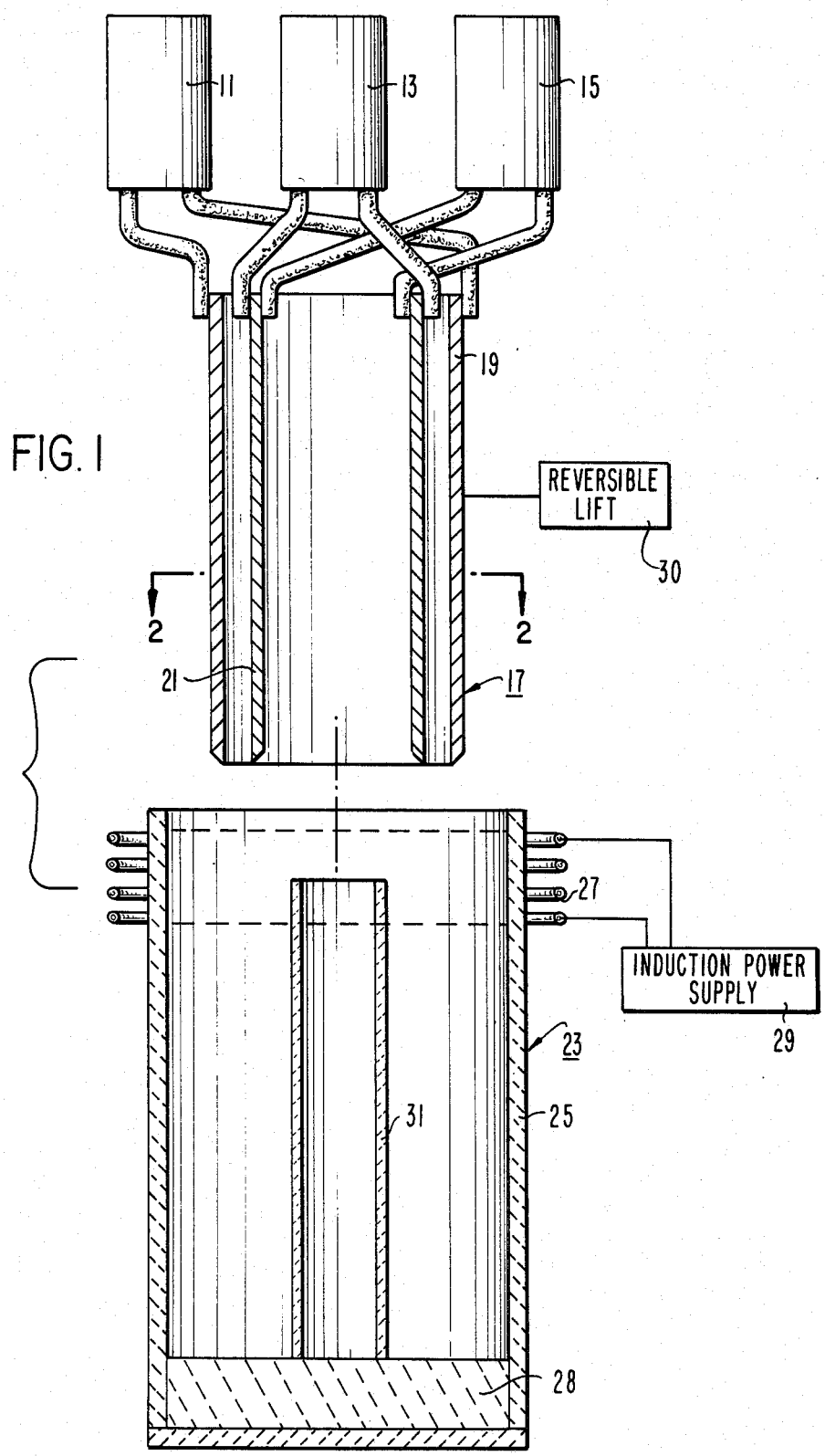
FIG. 1 is an front elevational sectional view showing a preferred furnace loading apparatus.

Looking now in detail at FIGS. 1 through 4, particulate feed material is supplied through supply hopper means, such as, 11, 13, 15. Suitably there is one hopper provided for each hollow vertical column of particulate material that is to be formed in the furnace. For example, as shown, one hopper would supply particulate silicon, one would supply particulate silicon carbide, carbon, or mixtures thereof, and one would supply particulate heat-insulating material. Loading means 17 is comprised of a plurality, at least two, concentrically arranged, dimensionally stable, hollow, open-ended cylindrical form members, 19 and 21, suitably fabricated of thin metal tubes. Loading means 17 is of a size that will spacedly fit within vertical vacuum induction furnace 23. Loading means 17 is positioned on insulating material, such as, 28, which suitably is particulate fused quartz. Induction furnace 23 is suitably comprised of a furnace tube 25, a vertically moveable induction coil 27 electrically connected to an electrical induction power supply 29. As shown, in FIGS. 1 through 5 and 7, induction furnace 23 also includes a heating core, or element, for example, 31. Furnace tube 25 is suitably fabricated of fused quartz, as such material is a good electrical insulator, is substantially impervious, can withstand reasonably high temperatures, has good thermal shock resistance, and is commercially available in large tubular forms. Heating element 31 is suitably fabricated of graphite and may be in the form of a simple hollow tube of graphite without spirals or cuts usually required in resistive heating elements. Loading means 17 is moveable in and out of furnace tube 25, suitably by means of a reversible lift, such as 30, of a type well known in the art, for example, an adjustable screw, rack and pinion, or worm gear arrangement.

Figure 2:
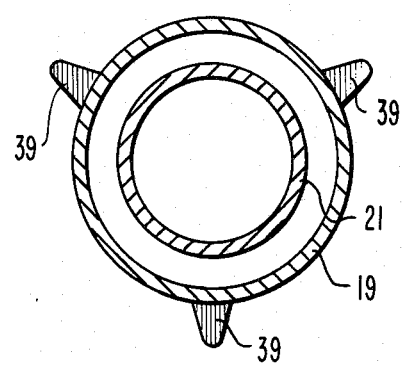
FIG. 2 is a sectional top view of the loading apparatus taken along lines 1-1' of FIG. 1 and also illustrates a centering, or spacing, means that may be utilized.

FIG. 2 illustrates a centering, or spacing, means, 39, that may be positioned on the the outside periphery of loading means 17. Spacing means 39 are eminently useful in enabling loading means 17 to be centered within furnace tube 25. Spacing means 39 may be in the form of extentions such as feet, or in the form of narrow, preferably intermittent, strips positioned along the periphery of outer form member 19.

Figure 3:
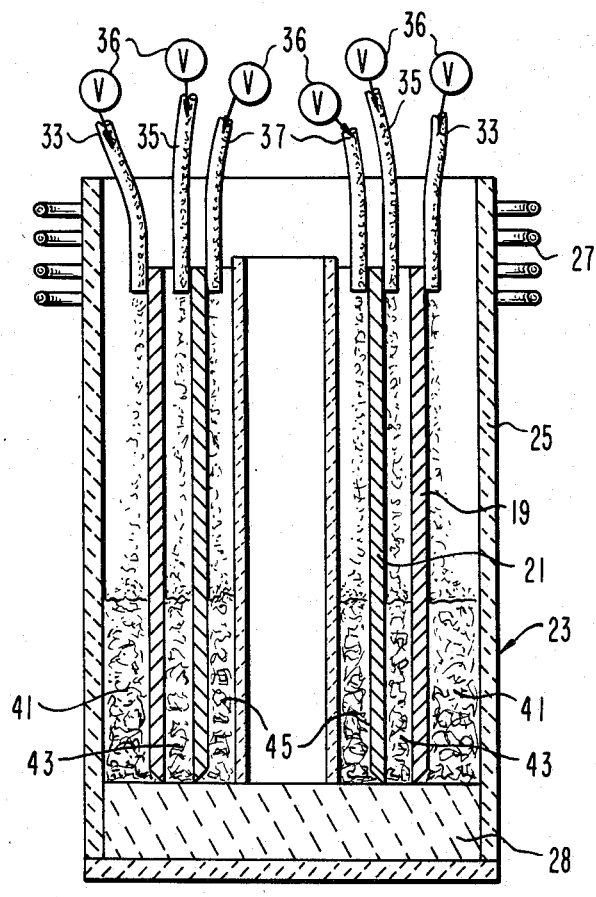
FIG. 3 is a partial vertical section of the induction furnace of FIG. 1 showing the loading means positioned within the furnace and the furnace being charged by the present dry casting method.

To load furnace 23, loading means 17 is lowered to the position shown in FIG. 3, by a reversible lift means, such as 30, into contact with insulation 28 positioned on the interior base portion of furnace tube 25. Loading means 17 is positioned so that it is centered, or substantially centered, within furnace tube 25. Hopper means 11, 13 and 15 have a plurality of feed means, or supply lines, such as, 33, 35 and 37, which may be in the form of hoses or chutes, separately connecting the individual hoppers with the spaces around and between form members 19 and 21. The feed means may include valves, such as 36, to control the flow therethrough. As shown the spaces in and around form members 19 and 21 are annularly defined by the inside of the furnace tube, the form members and the core, or heating element.

As shown in FIG. 3 loading means 17 is centered, or substantially centered, within furnace tube 25. The annular spaces defined by the interior of furnace tube 25, loading means 17 and by heating element 31 are being charged with particulate material from hoppers 11, 13 and 15. As shown, the annular space between the interior of furnace tube 25 and the outside of cylindrical form member 19 of loading device 17 is partially filled with particulate insulating material 41. Insulating material 41 functions to provide physical support for one surface of the particulate reactant material, insulate the furnace tube from high temperatures and allow the final product to be easily removed from the furnace tube. Insulating material 41 may be of any material which does not react with silicon, silicon carbide, carbon, or the material of the furnace tube. The material is one that is not wetted by molted silicon, that is, it is not silicon infilitrated. Boron nitride, aluminum nitride, silicon nitride, and oxides such as aluminum oxide, zirconia oxide and fused quartz are useful, boron nitride and aluminum nitride and fused quartz Rhave been found to be eminently useful. The annular space defined by the outside of cylindrical form member 21 and the inside of cylinder 19 is filled with particulate silicon carbide, carbon, or mixtures thereof, 43. The annular space defined by the inside of cylindrical form member 21 and heating element 31 is filled with particulate silicon, 45. The outside surface of heating element 31 is coated with a thin layer of boron nitride, aluminum nitride or silicon nitride to prevent molten silicon from wetting or reacting with it. It has been found that heating elements of high density, fine grain graphite are more resistant to molten silicon than low density, coarse grain graphite.

Figure 4:
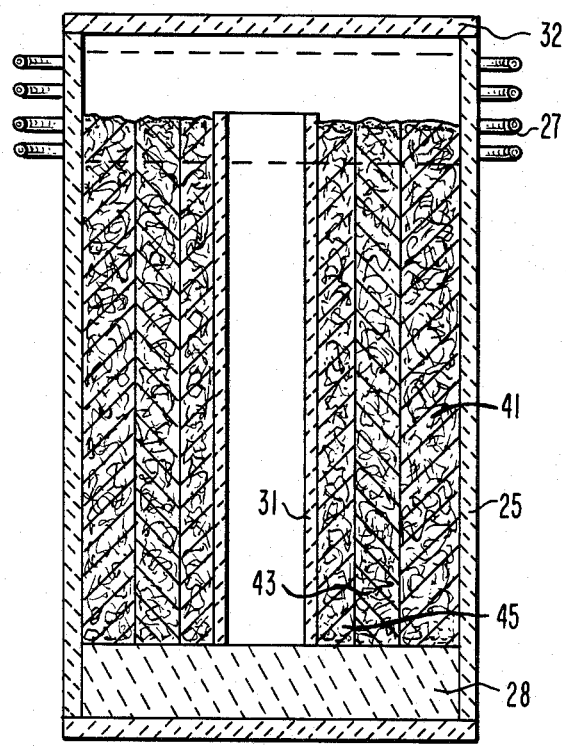
FIG. 4 is a partial vertical section of the induction furnace of FIG. 1 as the furnace would appear when fully charged and the loading means has been removed.

FIG. 4 shows the arrangement of FIG. 3 after furnace tube 25 has been charged. Loading means 17 has been removed from furnace tube 25 leaving hollow columns of reactant materials and insulating material. Cover 32 has been placed on tube 25. The space between the furnace charge and cover 32 may suitably be filled with an insulation material similar to that used in the base portion of the furnace.

Moveable induction coil 27 is then positioned at the top portion of furnace tube 25 and activated causing heating element 31 to increase in temperature. When heating element reaches a sufficiently high temperature, the hollow column of particulate silicon is melted and infuses, or infiltrates, into an appropriate adjacent column of particulate material. Induction coil 27 is then progressively moved downward along furnace tube 25, suitably by reversible lift means, such as 30, thus incrementally carrying out the siliciding process.

Figure 5:
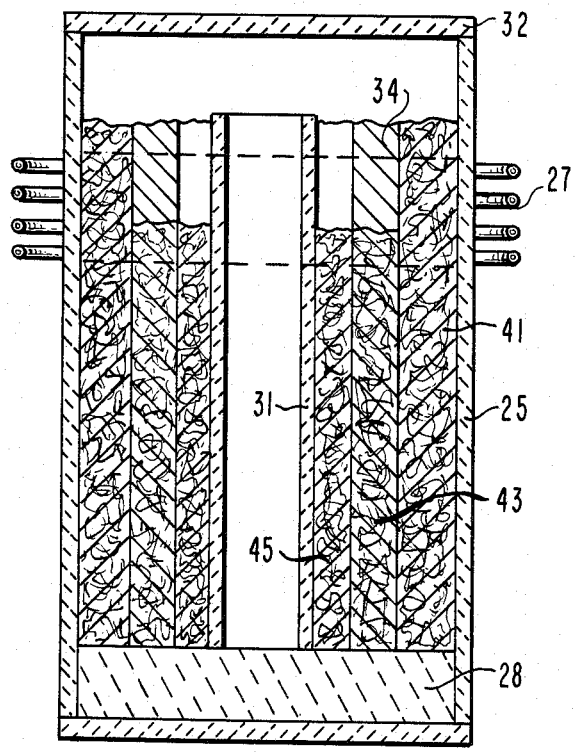
FIG. 5 is a partial vertical view of the induction furnace of FIG. 1 showing the furnace being heated to siliciding temperature and the tubular product being produced.

FIG. 5 illustrates the arrangement of FIG. 4 after initial heating of the furnace has begun. As shown the top portion of the silicon column has partially melted and infiltrated into the column containing silicon carbide, carbon, or mixtures thereof forming tube 34. Heating to siliciding temperature is progressively carried out from the top to the bottom of the furnace.

Figure 6:
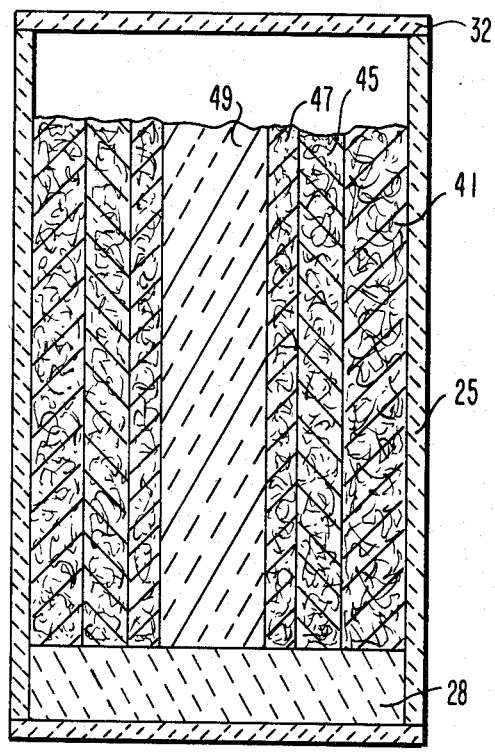
FIG. 6 is a partial vertical view of the induction furnace of FIG. 1 showing an alternative arrangement wherein the furnace is of the coreless type, that is, no internal heating element is utilized.

FIG. 6 illustrates an alternative arrangement whereby a coreless type furnace is employed, that is no heating element, as such, is utilized. In this arrangement a vertical column of carbon, preferably graphite, 47, is used as both a reactant and as the heating element. The center portion, or core, of furnace tube 25 is filled with insulating material 49.

Figure 7:
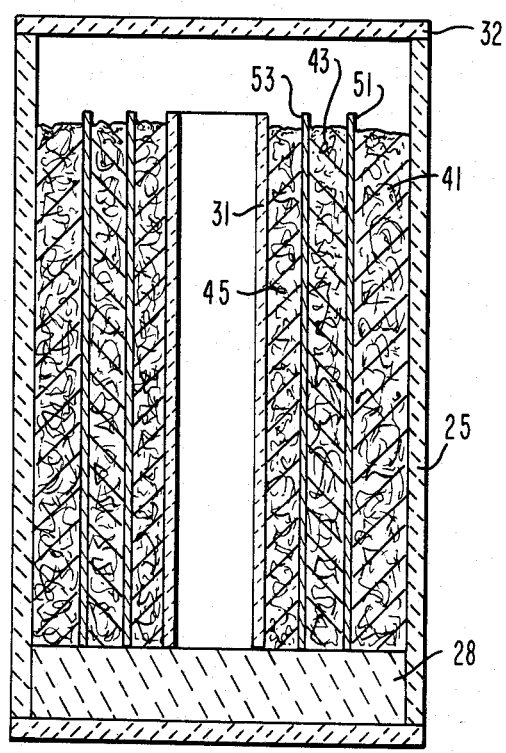
FIG. 7 is a partial vertical view of the induction furnace of FIG. 1 showing an alternate arrangement in which the particulate columns have an additional, temporary support means.

FIG. 7 illustrates a further alternative in which temporary supports 51 and 53 are provided to give additional stability to the columns of particulate materials and enable easier removal of loading means 17. Supports 51 and 53 are suitably fabricated of a combustible material such as paper. Waxed or coated paper may be used. Materials that are completely combustible or materials that leave a carbon residue are equally suitable.

The invention will now be described in greater detail by reference to the following examples, which are intended to illustrate, and not limit the scope of the invention. In the following examples, all parts are parts by weight and all temperatures are in degrees Centigrade.

EXAMPLE 1

A loading apparatus and vertical vacuum induction furnace as illustrated above was utilized. The loading means had an outside tube, corresponding to 19 in the drawings, having an outside diameter of 2.250 inches, and an inside diameter of 2.152 inches. One end of the tube was beveled toward the inside surface to form knife edge having a diameter of about 2.15 inches. The device had an inner tube, corresponding to 21 in the drawings, having an outside diameter of 2.000 inches and an inside diameter of 1.902 inches. One end of the inner tube was beveled toward the outside to form a knife edge with a diameter of 2.000 inches. The inner tube was held in concentric position within the outer tube by means of set screws.

The loading means was centered in a fused quartz furnace tube having a 2.772 inch inside diameter, a 3.025 inch outside diameter and a length of 24 inches. The furnace tube was positioned vertically in a support frame. The bottom end of the furnace tube was closed with a flat rubber vacuum gasket held by an aluminum plate to which a vacuum hose and pump were connected. The bottom three inches of the quartz tube were filled with ½ inch thick carbon felt discs to thermally insulate the rubber vacuum gasket.

Three feed hoppers were used. One for boron nitride grain SHP-40 grade, a product of Sohio Engineered Materials Company, one for silicon grain, grade Siligrain SG1-20 mesh, a product of Elkem Metals Company, and one for silicon carbide grain, a blend of 95% 50/100 mesh size No. 1, a product of Exolon-ESK Company and 5% dry phenolic resin, Dyphene grade 877P, a product of Sherwin-Williams Company.

The particulate feed material was fed through eighteen plastic ¼ inch inside diameter feeder tubes, six tubes for each of the feed materials. The feed tubes were arranged around the periphery of the top of the loading means in 60 degree increments. The feed tubes were arranged to feed particulate boron nitride in the space between the outer tube on the loading device and the inside of the furnace tube, particulate silicon carbide within the tubes of the loading means, and particulate silicon in the space between the inside of the loading means and the outside of furnace heating tube.

After filling the loading means was slowly raised to leave separate concentrically arranged, hollow columns of particulate boron nitride, silicon carbide-resin, and silicon. After removal of the loading means, the top space was filled with carbon felt discs and capped with a rubber gasket and a metal plate. A vacuum was applied to the lower end of the furnace tube.

An induction coil having twelve turns of 3/16 inch outside diameter copper tubing with a coil inside diameter of 3 ⅛ inches and a length of three inches, was connected to a 450 KHZ, 2 ¼ KW Lepel induction power supply and the coil started at the top of the furnace tube using a 0.8 plate current power input. The coil was lowered along the furnace tube at a rate of 0.33 inch per minute. The coil was stopped and the power turned off when the bottom of the quartz tube was approached. The furnace tube was then allowed to cool to room temperature, opened and the tubular product removed. The siliconized silicon carbide tube was easily removed from the quartz furnace tube as the boron nitride was still in loose granular form and unaffected by infiltration process. The heating element was easily removed from the siliconized silicon carbide tube as the silicon column had been removed by infiltration into the silicon carbide column. The siliconized silicon carbide tube product was found to be round and staight with little porosity in the microstructure. The silicon carbide volume in the microstructure was estimated by visual inspection to be about 50%. The outside diameter of the product was about 2.160 inches and the inside diameter of the the product was about 1.970 inch.

EXAMPLE 2

In this Example, graphite powder having an approximate grain size of minus 150 mesh and a tap density of 0.58 g/cm was used in place of the silicon carbide-resin component as was used in Example 1 and in place of the furnace heating element a core of insulating grain was used. The procedure used otherwise followed that of example 1. A photomicrograph of a polished section of the tubular product revealed that the graphite particles were not completely converted to silicon carbide and that only a thin layer of silicon carbide was present on the surface of the graphite particles which were in turn surrounded by a matrix of silicon.

EXAMPLE 3

In this Example the furnace tube was charged with concentric layers of insulation grain, silicon grain and graphite powder packed around a core of insulation grain. Otherwise the procedure of Example 1 was followed. The product was similar to that in Example 2.

While the present invention has been described in detail in connection with specific embodiments thereof, it will be understood that further embodiments and modifications may be may be made without departing from the spirit and scope of the appended claims.

What is claimed is:

1. A method of making a ceramic tube comprised of silicon and silicon carbide which comprises the steps of:
   (a). dry casting a first hollow, vertical tubular column of a particulate material,
   (b). dry casting a second hollow, vertical tubular column of a particulate material contiguous to, and in concentric relation to, said first column, the particulate material of one column comprised of silicon, and the particulate material of the other column comprised of material selected from the group of silicon carbide, carbon or mixtures thereof,
   (c). heating said columns to a siliciding temperature to infiltrate substantially entirely all of said silicon from said first column into said second column, and
   (d). cooling said infiltrated column to form a hollow, dimensionally stable ceramic tube.

2. The method of claim 1 wherein said second column is comprised of silicon carbide.

3. The method of claim 1 wherein said second column is comprised of carbon.

4. The method of claim 1 wherein said second column is comprised of silicon carbide and carbon.

5. The method of claim 1 wherein the columns are heated to a temperature above the melting point of silicon and less than about 2400 degrees C.

6. The method of claim 1 wherein the siliciding step is carried out under a vacuum.

7. The method of claim 1 wherein the siliciding step is carried out in an inert atmosphere.

8. The method of claim 1 wherein the column containing silicon carbide, carbon, or mixtures thereof also contains a resin binder.

9. The method of claim 8 wherein the binder is added in a dry particulate form.

10. The method of claim 8 wherein the binder is added in a liquid form and is subsequently dried on the particulate material.

11. The method of claim 1 wherein the heating step is by electric induction.

12. The method of claim 1 wherein the heating step is carried out in an electrical induction furnace having a resistive heating core.

13. The method of claim 3 wherein the heating step is carried out in a coreless type electric induction furnace.

* * * * *